US008538957B1

(12) United States Patent
Zhou et al.

(10) Patent No.: US 8,538,957 B1
(45) Date of Patent: Sep. 17, 2013

(54) VALIDATING TRANSLATIONS USING VISUAL SIMILARITY BETWEEN VISUAL MEDIA SEARCH RESULTS

(75) Inventors: Yun Zhou, Mountain View, CA (US); Vanessa Hodge, San Francisco, CA (US); Gaurav Garg, Palo Alto, CA (US); Radhika Malpani, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 537 days.

(21) Appl. No.: 12/477,577

(22) Filed: Jun. 3, 2009

(51) Int. Cl.
*G06F 17/30* (2006.01)

(52) U.S. Cl.
USPC ............................. 707/728; 707/760; 707/737

(58) Field of Classification Search
CPC .................... G06F 17/30864; G06F 17/30867; G06Q 30/02
USPC ........................................ 707/728, 760, 737
See application file for complete search history.

(56) References Cited

U.S. PATENT DOCUMENTS

| | | | | |
|---|---|---|---|---|
| 5,893,095 | A * | 4/1999 | Jain et al. ................. | 1/1 |
| 5,911,139 | A * | 6/1999 | Jain et al. ................. | 1/1 |
| 5,913,205 | A * | 6/1999 | Jain et al. ................. | 1/1 |
| 6,006,221 | A | 12/1999 | Liddy et al. | |
| 6,078,916 | A * | 6/2000 | Culliss ................. | 707/5 |
| 6,381,598 | B1 | 4/2002 | Williamowski et al. | |
| 6,526,400 | B1 | 2/2003 | Takata et al. | |
| 6,594,654 | B1 | 7/2003 | Salam et al. | |
| 6,604,101 | B1 | 8/2003 | Chan et al. | |
| 6,640,218 | B1 * | 10/2003 | Golding et al. ................. | 707/2 |
| 6,701,309 | B1 * | 3/2004 | Beeferman et al. ................. | 707/3 |
| 6,757,646 | B2 | 6/2004 | Marchisio | |
| 6,983,270 | B2 * | 1/2006 | Rippich ................. | 707/3 |
| 7,047,182 | B2 | 5/2006 | Masuichi | |
| 7,130,849 | B2 * | 10/2006 | Yayoi et al. ................. | 704/7 |
| 7,146,358 | B1 | 12/2006 | Gravano et al. | |
| 7,165,080 | B2 * | 1/2007 | Kotcheff et al. ................. | 707/706 |
| 7,260,570 | B2 | 8/2007 | Brown et al. | |
| 7,421,097 | B2 * | 9/2008 | Hamza et al. ................. | 382/118 |
| 7,668,823 | B2 * | 2/2010 | Oldham et al. ................. | 707/723 |
| 7,672,831 | B2 | 3/2010 | Todhunter et al. | |
| 7,698,331 | B2 * | 4/2010 | Carson et al. ................. | 707/728 |
| 7,720,856 | B2 * | 5/2010 | Goedecke et al. ................. | 707/759 |
| 7,752,032 | B2 * | 7/2010 | Izuha ................. | 704/7 |
| 7,773,800 | B2 * | 8/2010 | Liu ................. | 382/158 |
| 7,783,633 | B2 * | 8/2010 | Florian et al. ................. | 707/729 |

(Continued)

OTHER PUBLICATIONS

Bergsma et al., "Learning Bilingual Lexicons using the Visual Similarity of Labeled Web Images", In Proceedings of IJCAI, 2011, 6 pages.*

(Continued)

*Primary Examiner* — Phuong Thao Cao
(74) *Attorney, Agent, or Firm* — Fish & Richardson P.C.

(57) ABSTRACT

Methods, systems, and apparatus, including computer program products, for validating candidate translations for a phrase. A plurality of candidate translations for a phrase are received. A similarity score for each of the candidate translations is calculated. Each similarity score is an estimate of visual similarity between a group of visual media search results responsive to a visual media search query with text corresponding to the phrase and a group of visual media search results responsive to a visual media search query with text corresponding to a candidate translation. One or more of the candidate translations are selected based on the similarity scores. The selected candidate translations are associated with the phrase as valid translations for the phrase.

24 Claims, 9 Drawing Sheets

(56) References Cited

U.S. PATENT DOCUMENTS

| | | | |
|---|---|---|---|
| 7,813,917 B2* | 10/2010 | Shuster | 704/9 |
| 7,818,314 B2* | 10/2010 | Chowdhury et al. | 707/722 |
| 7,917,488 B2 | 3/2011 | Niu et al. | |
| 7,991,608 B2 | 8/2011 | Johnson et al. | |
| 8,024,337 B1* | 9/2011 | Baluja et al. | 707/736 |
| 8,051,061 B2* | 11/2011 | Niu et al. | 707/706 |
| 8,065,296 B1* | 11/2011 | Franz et al. | 707/723 |
| 8,171,041 B2 | 5/2012 | Bennett | |
| 8,209,330 B1* | 6/2012 | Covell et al. | 707/728 |
| 8,244,720 B2* | 8/2012 | Bihun et al. | 707/723 |
| 8,364,462 B2 | 1/2013 | Joy et al. | |
| 8,457,416 B2* | 6/2013 | Liu et al. | 382/229 |
| 2001/0021934 A1 | 9/2001 | Yokoi | |
| 2001/0029455 A1 | 10/2001 | Chin et al. | |
| 2002/0097914 A1* | 7/2002 | Yaung | 382/225 |
| 2002/0123982 A1 | 9/2002 | Masuichi | |
| 2002/0156763 A1 | 10/2002 | Marchisio | |
| 2002/0164075 A1* | 11/2002 | Acharya et al. | 382/190 |
| 2002/0184206 A1 | 12/2002 | Evans | |
| 2003/0035595 A1* | 2/2003 | Liu | 382/305 |
| 2003/0050923 A1* | 3/2003 | Chang et al. | 707/3 |
| 2003/0149686 A1 | 8/2003 | Drissi et al. | |
| 2003/0200079 A1 | 10/2003 | Sakai | |
| 2004/0006560 A1 | 1/2004 | Chan et al. | |
| 2004/0261021 A1 | 12/2004 | Mittal et al. | |
| 2005/0060311 A1* | 3/2005 | Tong et al. | 707/7 |
| 2005/0267734 A1* | 12/2005 | Masuyama | 704/2 |
| 2006/0129915 A1 | 6/2006 | Chan | |
| 2006/0173839 A1 | 8/2006 | Knepper et al. | |
| 2006/0173886 A1 | 8/2006 | Moulinier et al. | |
| 2006/0217954 A1* | 9/2006 | Koyama et al. | 704/2 |
| 2006/0230022 A1 | 10/2006 | Bailey et al. | |
| 2006/0230035 A1* | 10/2006 | Bailey et al. | 707/5 |
| 2006/0241934 A1* | 10/2006 | Izuha | 704/2 |
| 2006/0271350 A1* | 11/2006 | Chino et al. | 704/2 |
| 2007/0106653 A1* | 5/2007 | Sun | 707/4 |
| 2007/0250494 A1 | 10/2007 | Peoples et al. | |
| 2007/0276820 A1* | 11/2007 | Iqbal | 707/4 |
| 2008/0015843 A1* | 1/2008 | Barghout | 704/7 |
| 2008/0104045 A1* | 5/2008 | Cohen et al. | 707/4 |
| 2008/0183685 A1* | 7/2008 | He et al. | 707/4 |
| 2008/0189257 A1 | 8/2008 | Wiseman et al. | |
| 2008/0288474 A1 | 11/2008 | Chin et al. | |
| 2008/0300854 A1* | 12/2008 | Eibye | 704/3 |
| 2009/0024613 A1* | 1/2009 | Niu et al. | 707/5 |
| 2009/0063455 A1* | 3/2009 | Li et al. | 707/5 |
| 2009/0070318 A1* | 3/2009 | Song et al. | 707/5 |
| 2009/0074306 A1* | 3/2009 | Liu et al. | 382/229 |
| 2009/0076800 A1* | 3/2009 | Li et al. | 704/10 |
| 2009/0083243 A1* | 3/2009 | Heymans et al. | 707/4 |
| 2009/0089332 A1 | 4/2009 | Harger et al. | |
| 2009/0125497 A1 | 5/2009 | Jiang et al. | |
| 2009/0132233 A1* | 5/2009 | Etzioni et al. | 704/3 |
| 2009/0222437 A1 | 9/2009 | Niu et al. | |
| 2009/0326914 A1 | 12/2009 | Joy et al. | |
| 2010/0070662 A1 | 3/2010 | Odenwald et al. | |
| 2010/0161642 A1* | 6/2010 | Chen et al. | 707/759 |
| 2010/0198837 A1* | 8/2010 | Wu et al. | 707/748 |
| 2011/0055189 A1* | 3/2011 | Effrat et al. | 707/706 |

OTHER PUBLICATIONS

Access all of your business content through one search box. Datasheet [online]. Google Search Appliance 6.0 [retrieved on Jun. 2, 2009]. Retrieved from: 2Fgsa_datashett.pdf&ei=vH33SbriKKPFtgfA_eCiDw&usg=AFQjCNE_skaQmDwohxU9IIdeQ6Dfkzdl1w.

Aljlayl, Mohammed et al., 'On Arabic-English Cross-Language Information Retrieval: *A Machine Translation Approach*', *Information Retrieval Laboratory* [online]. *Illinois Institute of Technology* [retrieved on Jun. 2, 2009]. Retrieved from: http://www.ir.iit.edu/publications/donwloads/073_aljlayl_m.pdf.

Etzioni, Oren et al. 'Lexical Translation with Application to Image Search on the Web', Turning Center [online], Dept. of Computer Science and Engineering, University of Washington [retrieved on Jun. 2, 2009]. Retrieved from: http://turing.cs.washington.edu/papers/EtzioniMTSummit07.pdf.

Google translate, 'Translated Search' [online], [retrieved on Jun. 2, 2009]. Retrieved from: http://translate.google.com/translate_s?hl=en.

History of Yandex, 1997-2009 Yandex [online], [retrieved on Jun. 2, 2009] Retrieved from: http://company.yandex.com/general_info/history.xml.

Example of image search, Yandex close up, ЯНДЕКС [online], [retrieved on May 5, 2009] Retrieved from: http://images.yandex.ru.

Example of image search, Yandex search results, ЯНДЕКС [online], [retrieved on May 5, 2009] Retrieved from: http://images.yandex.ru.

Lockergnome, 'PanImages Image Search Tool Speaks Hundreds of Languages', Sep. 12, 2007, [online]. 1996-2009 Tech News Watch and Lockergnome [retrieved on Jun. 2, 2009]. Retrieved from: http://www.lockergnome.com/news/2007/09/12/panimages-image-search-tool-speaks-hundereds-of-lanugages/.

Youssef, Moustafa A., 'Cross Language Information Retrieval', Apr. 2001 [online] Department of Computer Science, University of Maryland [retrieved on Jun. 2, 2009]. Retrieved from: http://www.otal.umd.edu/UUPractice/clir.

U.S. Appl. No. 12/481,421, filed Jun. 9, 2009, Query Translation Quality Confidence, Hodge et al.

U.S. Appl. No. 12/481,448, filed Jun. 9, 2009, Query Translation Using Bilingual Search Refinements, Hodge et al.

U.S. Appl. No. 12/481,454, filed Jun. 9, 2009, Selecting Relevant Languages for Query Translation, Hodge et al.

Ambati and U, "Using Monolingual Clickthrough Data to Build Cross-lingual Search System", ACM, 2006, 8 pages.

Chen, "Multilingual Information Retrieval Using English and Chinese Queries", University of California at Berkeley, 2002, 7 pages.

Chen and Gey, "Multilingual Information Retrieval Using Machine Translation, Relevance Feedback and Decompounding", Kluwer Academic Publishers, Netherlands, 2004, 34 pages.

Clough and Sanderson, "User Experiments With the Eurovision Cross-Language Image Retrieval System", Sheffield University, 2006, 12 pages.

Clough et al, "The CLEF 2005 Cross-Language Image Retrieval Track", Sheffield University, UK, 2005, 22 pages.

Gao et al., "Cross-Lingual Query Suggestion Using Query Logs of Different Languages", The Chinese University of Hong Kong, ACM, 2007, 8 pages.

Gey et al, "Cross Language Information Retrieval: A Research Roadmap", SIGIR, 2002, 9 pages.

Gey et al, "New Directions in Multilingual Information Access", SIGIR, 2006, 9 pages.

He et al, "Studying the Use of Interactive Multilingual Information Retrieval", ACM, 2006, 8 pages.

History of Yandex, [online], [retrieved on Jun. 2, 2009]. Retrieved from: http://company.yandex.com/general_info/history.xml, 3 pages.

Hu et al., "Mining Translation of Web Queries from Web Clickthrough Data", Department of Computer Science, Huazhong University of Science and Technology, China, 2008, 6 pages.

Jones, "New Challenges for Cross-Language Information Retrieval: multimedia data and user experience", Cross-Language Evaluation Forum Workshop, Portugal, 2000, 9 pages.

Kimura et al., "Cross-Language Information Retrieval Based on Category Matching Between Language Versions of a Web Directory", Japan, 2003, 8 pages.

Kumaran, et al, "On Pushing Multilingual Query Operators into Relational Engines", Database Systems Laboratory, India, 2006, 10 pages.

Lu, et al, "Analysis of the Bilingual Queries of a Chinese Web Search Engine", Hong Kong, 2006, 2 pages.

Maeda, et al., "Query Term Disambiguation for Web Cross-Language Information Retrieval using a Search Engine", ACM, 2000, 8 pages.

Oard, Douglas W., "Interactive Cross-Language Information Retrieval", 2001, 3 pages.

Parton, et al, "Simultaneous Multilingual Search for Translingual Information Retrieval", ACM, 2008, 10 pages.

Sanderson, et al, "Measuring a cross language image retrieval system", Sheffield University, UK, 2004, 9 pages.

* cited by examiner

VALIDATING TRANSLATIONS USING VISUAL SIMILARITY BETWEEN VISUAL MEDIA SEARCH RESULTS

BACKGROUND

This specification relates to translation validation using visual similarity between visual media search results. Various techniques are used to translate words and phrases from one language to another language. However, these translation techniques do not always capture the nuances with which words and phrases are used to describe concepts. For example, in Italian, "top( )" means mouse (an animal). A common translation of "top( )" into English is "mouse." However, in English, "mouse" is used to mean both an animal and a user input device for a computer. Thus, a translation from the Italian "top( )" to the English "mouse" introduces the irrelevant concept of a user input device, and a translation from the English "mouse" to the Italian "top( )" loses the concept of a user input device.

SUMMARY

This specification describes technologies relating to translation validation using visual similarity between visual media search results.

In general, one aspect of the subject matter described in this specification can be embodied in a method that includes the acts of receiving a plurality of candidate translations for a phrase, wherein the phrase is in a first language and each candidate translation is a translation of the phrase into a different language from the first language. A similarity score for each of the candidate translations is calculated. The similarity score is an estimate of visual similarity between a first group of visual media search results responsive to a first visual media search query with text corresponding to the phrase and a second group of visual media search results responsive to a second visual media search query with text corresponding to the candidate translation. One or more of the candidate translations are selected based on the similarity scores. Each of the one or more selected candidate translations are associated with the phrase as a valid translation for the phrase. Other implementations include corresponding systems, apparatus, computer program products, and computer storage media.

These and other implementations can optionally include one or more of the following features. Generating the similarity score for a candidate translation can include selecting the first group of visual media search results responsive to the first visual media search query, selecting the second group of visual media search results responsive to the second visual media search query, generating feature scores for pairs of visual media search results, and generating the similarity score from the feature scores. Each pair can include a respective visual media search result from the first group of visual media search results and a respective visual media search result from the second group of visual media search results, and each feature score can estimate visual similarity between a pair's respective visual media search results from a plurality of features of the respective visual media search results. Generating the similarity score from the feature scores can include averaging a number of top feature scores. Generating the similarity score from the feature scores can include, for each first visual media search result in the first group of visual media search results, selecting a top number of feature scores for pairs including the first visual media search result, and calculating an average of the selected feature scores.

The first group of visual media search results can be identified according to data indicative of user behavior for visual media search results responsive to the first visual media search query, and the second group of visual media search results responsive to the second visual media search query can be identified according to data indicative of user behavior for visual media search results responsive to the second visual media search query.

The method can further include generating a respective quality of results statistic for each of the candidate translations. The quality of results statistic estimates a quality of search results responsive to a query for the candidate translation. Selecting one or more candidate translations can be further based on the respective quality of results statistic for each candidate translation.

The method can further include receiving a third visual media search query with text corresponding to the phrase, identifying the selected one or more candidate translations associated with the phrase, and generating a set of one or more visual media search results based on the third visual media search query and the selected one or more candidate translations.

A visual media search result can be an image, a video, an image embedded in a first file, or a video embedded in a second file.

In general, another aspect of the subject matter described in this specification can be embodied in a method that includes the acts of receiving a plurality of candidate related phrases for a first phrase; calculating a similarity score for each of the candidate related phrases, wherein the similarity score is an estimate of visual similarity between a first group of visual media search results responsive to a first visual media search query with text corresponding to the first phrase and a second group of visual media search results responsive to a second visual media search query with text corresponding to the related phrase; and selecting one or more of the candidate related phrases based on the similarity scores and associating each of the one or more selected candidate related phrases with the phrase. Other implementations include corresponding systems, apparatus, computer program products, and computer storage media.

These and other implementations can optionally include the following feature. The method can further include receiving a search query with text corresponding to the phrase and presenting one or more of the selected one or more candidate related phrases as suggested alternative queries.

Particular embodiments of the subject matter described in this specification can be implemented so as to realize one or more of the following advantages. The quality of translations can be estimated. Translations can be compared based on visual similarity scores. Relationships between phrases, both in the same language and in different languages, can be identified. A higher quality of visual media search results can be presented to a user. A broader group of visual media search results can be presented to the user. A group of visual media search results that are more responsive to a user's intended search can be presented to the user. Search results relevant to a local concept can be returned even if the user searches in a language different from the local language. Relevant query suggestions can be presented to a user in response to receiving a query from a user.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
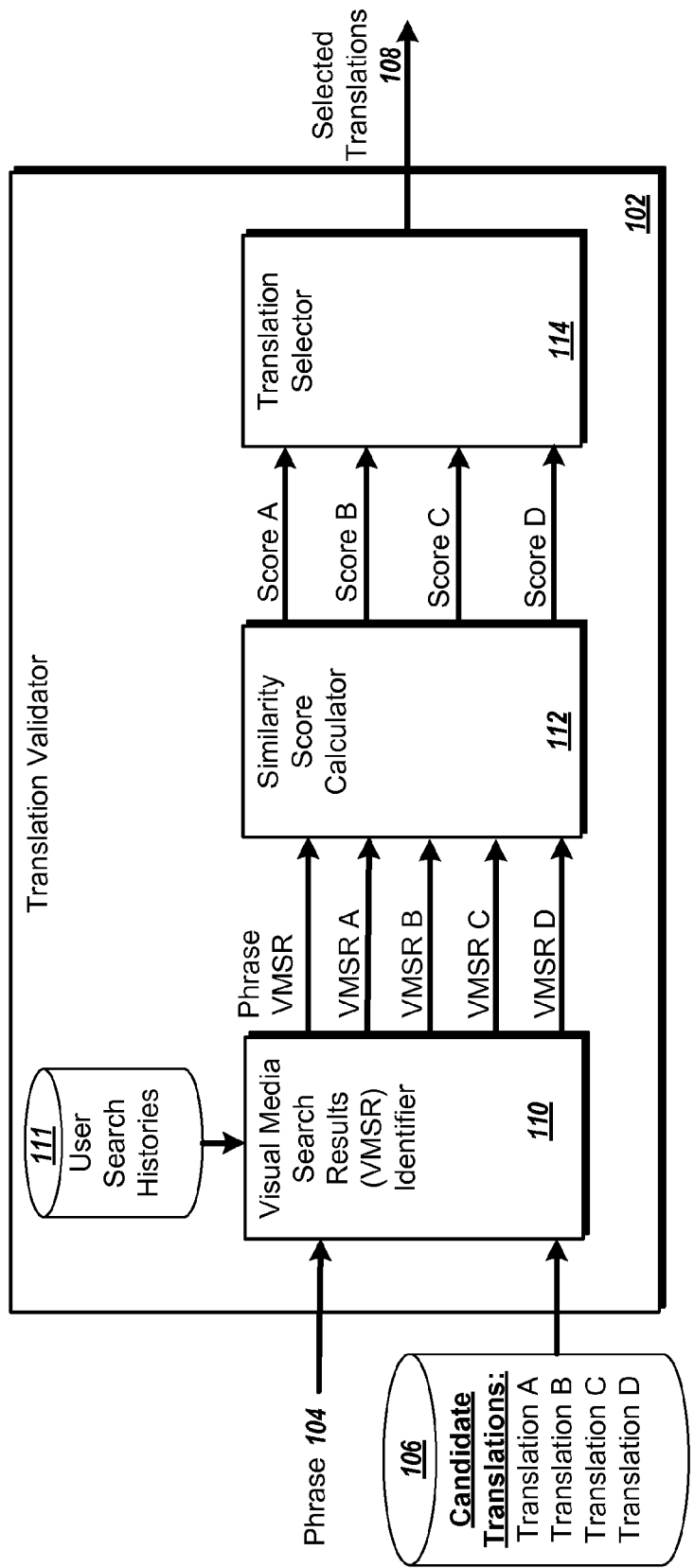
FIG. 1 illustrates an example translation validator.

FIG. 1 illustrates an example translation validator 102. The translation validator 102 receives a phrase 104 in a natural language, such as French, and one or more candidate translations of the phrase 106, processes the phrase 104 and the candidate translations 106, and outputs a set of selected translations 108. The phrase 104 includes one or more words or symbols. Each candidate translation is a translation of the phrase into a language different from the phrase. Two languages can be different when they are distinct languages, for example, English and French, or when they are different dialects of the same language. The candidate translations can be generated, for example, using standard translation techniques. While FIG. 1 illustrates validating a translation from a phrase to one or more candidate phrases, the translation validator can also validate relationships between a phrase and other candidate related phrases, regardless of the language of the phrase and the candidate related phrases. For example, the translation validator can validate a relationship between two different phrases in the same language used to describe the same concept (or similar concepts).

The translation validator 102 includes a visual media identifier 110, a similarity score calculator 112, and a translation selector 114. The boxes shown in FIG. 1 logically represent executing software components or modules corresponding to the visual media identifier 110, similarity score calculator 112, and translation selector 114. These components can be combined or subdivided in ways other than those shown in FIG. 1, and can be distributed on two or more computing devices.

The visual media identifier 110 receives the phrase 104 and the candidate translations 106 and selects a set of visual media search results for the phrase 104 and for each candidate translation 106. The responsive visual media search results can be received, for example, from a search engine that receives a visual media search query and returns one or more visual media search results that are responsive to the search query. Examples of visual media search results include images, videos, images embedded in files, video embedded in files, and interactive media such as JavaScript or ActionScript games. In general, the set of visual media search results for a given phrase 104 (or translation 106) are visual media search results that are responsive to a visual media search query for the phrase 104 (or a query for the translation 106). A visual media search is a text-based search for visual media objects and the visual media search query is the text on which the search is based.

In some implementations, the visual media identifier 110 selects the sets of visual media search results based on data indicative of historical user behavior for visual media search results responsive to the phrase 104 and the translation 106. In some implementations, the data indicative of historical user behavior is so-called click data measuring how often users select (e.g., "click" with a mouse or other user input device, or select using other input such as a voice command) a search result that is responsive to a query. The visual media identifier 110 selects the sets of visual media search results, for example, by selecting a number of top clicked visual media search results for the queries for the phrase and the top clicked visual media search results for the queries for each translation according to the data indicative of historical user behavior (e.g., the top ten clicked visual media search results for queries for the phrase and the top ten clicked visual media search results for queries for each translation, or the top five clicked visual media search results for a query for the phrase and the top eight clicked visual media search results for queries for each translation).

The visual media identifier 110 (or another system, for example, a search system) generates click data, for example, by analyzing user search histories 111, e.g., collected over time. A user search history stores a sequence of search queries submitted by a user, a computer or a process. In general, a search history tracks what queries a user submitted, what documents a search engine identified as responsive to the query, which of the responsive search results were presented to the user, which of the responsive search results the user selected, and how long each selected search result was viewed. The search queries in the search history can be visual media search queries or any other type of search query, for example a document search query. Multiple types of search queries can be included in the search history. User search histories may also store additional information, such as the IP address of the user, language preferences of a user, or geographic location information for a user. User search histories can be created based on information sent from a user's computer to a search engine. User search histories 111 are a convenient way to store user search history information. However, other formats for organizing and storing the user search history information captured by a user search history can also be used.

The visual media identifier 110 can also select the visual media search results for the phrase 104 or the translation 106 in other ways. For example, in some implementations, the visual media identifier 110 selects the top ranked visual media search results responsive to a query for the phrase 104 or a query for the translation 106, where the ranking is received, for example, from the search engine that identified the search results as responsive to the query. In other implementations, the visual media identifier 110 selects a number of visual media search results that have been labeled by users as relevant to the phrase 104 (or the translation 106). Users can label images, for example, when the images are uploaded to a server. Alternatively, the translation validator (or another system, for example, a search system) can receive labels from other users after images are uploaded to the server. Labels do not have to be received from a user, but can also be received from automated systems that analyze images and identify prominent features. In still other implementations, the visual media identifier 110 selects the visual media search results from clusters of visual media search results identified, for example, by a search engine. A search engine can cluster images responsive to a query for the phrase (or the translation) so that images corresponding to the same meaning of the phrase are clustered together. For example, if the phrase is "mouse," one cluster of images can be related to mouse, the animal, and one cluster of images can be related to mouse, the computer input device. The visual media identifier 110 then selects a top number of visual media search results (e.g., a number of top-clicked visual media search results, or a number of highest scoring visual media search results) from each cluster. The visual media identifier 110 can select the same number of visual media search results from each cluster, or can select different numbers of visual media search results (for example, by selecting more search results from more popular clusters). A cluster is popular, for example, when the visual media search results in the cluster have a high number of clicks or high ranks.

In some implementations, the visual media identifier 110 selects visual media search results responsive to a query for the phrase 104 (or translation 106) and visual media search results responsive to similar queries. Two queries are similar, for example, when they differ only in small differences in spelling, small differences in word order, the use of abbreviations, the use of synonyms, or the use of stop words (e.g., known terms that do not contribute to the topicality of the query such as "a" or "the"). Other measures of similarity can also be used, for example, the edit distance for the two queries.

The number of selected visual media search results can be determined in various ways. In some implementations, the number of visual media search results is pre-determined, and can be the same for both visual media search results responsive to a query for the phrase and visual media search results responsive to a query for the candidate translation, or can be different for the two groups of visual media search results. In other implementations, all visual media search results that satisfy a threshold are selected. For example, all visual media search results having a number of clicks above a predetermined threshold can be selected. The threshold can be determined, for example, empirically.

The similarity score calculator 112 compares the visual media search results identified for the phrase 104 and the visual media search results identified for each translation 106 and generates a similarity score for each translation 106. The similarity score for a translation measures the similarity between the visual media search results for the translation 106 and the visual media search results for the phrase 104. The similarity score calculator is described in more detail below with reference to FIG. 2.

The translation selector 114 selects one or more candidate translations based on the similarity scores for each translation. In some implementations, the translation selector selects a pre-determined number of translations (for example, the one translation with the highest score). In some implementations, the translation selector selects all translations whose similarity score satisfies (e.g., exceeds) a threshold. The threshold can be determined, for example, empirically.

Figure 2:
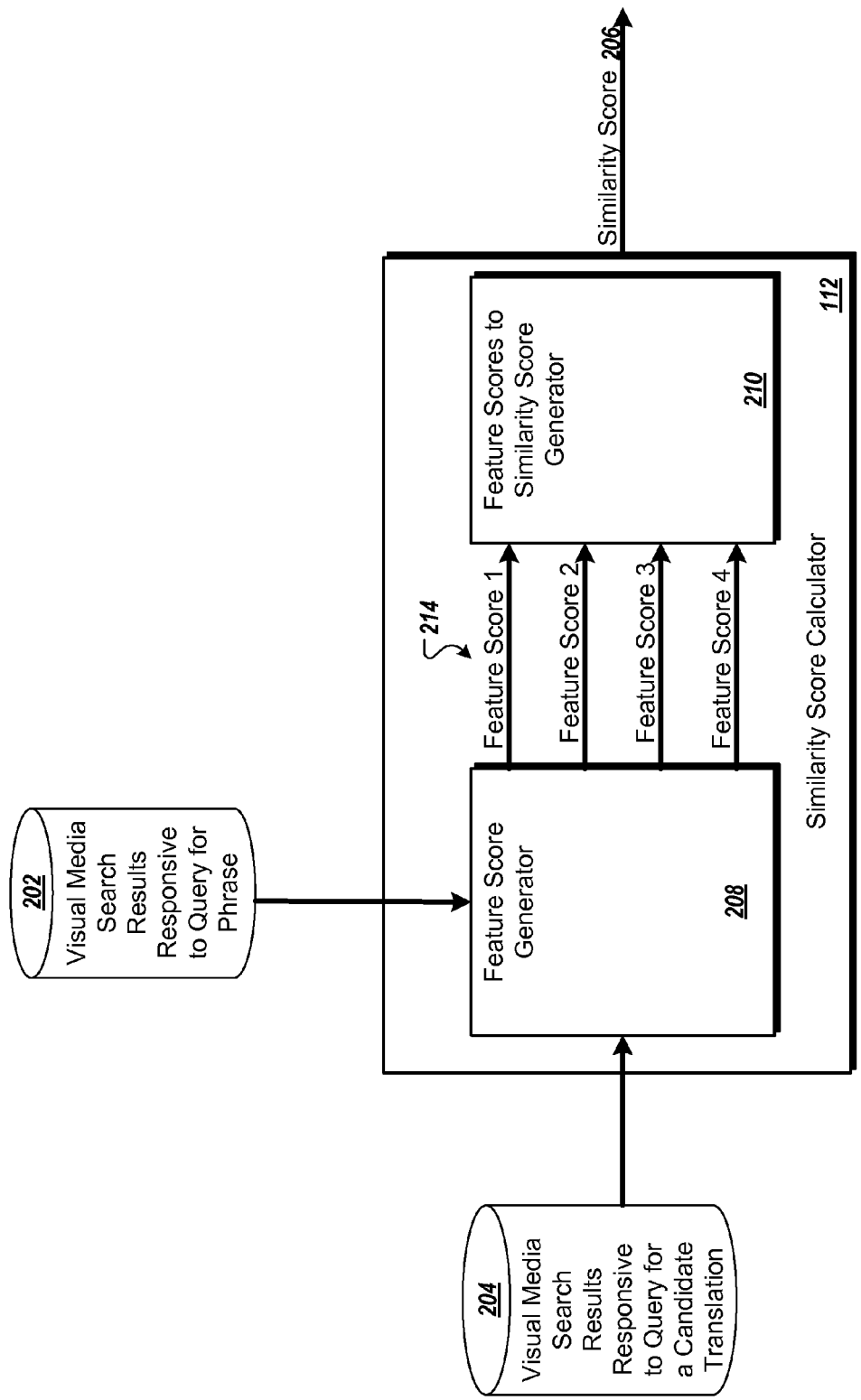
FIG. 2 illustrates an example similarity score calculator.

FIG. 2 illustrates an example of the similarity score calculator 112. The similarity score calculator 112 receives a set of visual media search results 202 responsive to a visual media search query for a phrase and a set of visual media search results 204 responsive to a visual media search query for a candidate translation of the phrase, and generates a similarity score for the phrase and the candidate translation from a comparison of the visual media search results. The similarity score calculator 112 uses a feature score generator 208 to generate feature scores (e.g., feature score 214) for pairs of the visual media search results. Each pair corresponds to a visual media search result responsive to a visual media search query for the phrase and a visual media search result responsive to a visual media search query for the candidate translation.

In general, the feature score estimates visual similarity between the pair of visual media search results. In some implementations, the feature score is calculated by comparing vectors of feature scores for the two visual media search results. Examples of visual media search result features include image features such as colors, shapes, edges, corners, interest points, regions of interest, and ridges. The similarity score calculator 112 detects individual features of the visual media search results, for example, by applying one or more feature detection algorithms including, for example, the Canny algorithm, the Canny-Deriche algorithm, the Differential algorithm, the Soble algorithm, the Harris operator, the Shi and Tomasi algorithm, the Level curve curvature algorithm, the Smallest Univalue Segment Assimilating Nucleus (SUSAN) algorithm, the Features from Accelerated Segment Test (FAST), the Laplacian of Gaussian (LoG) algorithm, the Difference of Gaussians (DoG) algorithm, the Determinant of Hessian (DoH) algorithm, the maximally stable extremal regions algorithm, the affine shape adaptation algorithm, the Harris affine algorithm, the Hessian affine algorithm, the Scale-invariant feature transform (SIFT), the Speeded Up Robust Features (SURF) algorithm, the Gradient Location and Orientation Histogram (GLOH) algorithm, the Local Energy based Shape Histogram (LESH) algorithm, and the Hough transform. Other feature detection algorithms can also be used. Before the features are compared, they can be normalized, for example, to account for variations such as rotation, translation, differences in scale, reflection, or different colors in the images (for example, color instead of grayscale, or red instead of blue). In some implementations, when the visual media search results include search results other than images, the feature score generator 208 further identifies features based on other aspects of the visual media search results, for example, temporal aspects of a video. For example, the low-level video visual content descriptors used in MPEG-7 can be used.

Once the similarity score calculator 112 detects the features, it generates a vector corresponding to the features and generates a feature score (e.g., 214) based on the similarity of the vectors. In some implementations, the feature score is the cosine distance between the feature vectors for the two visual media search results. For example, if the visual media search result corresponding to the phrase has a feature vector of $X=(x_1, x_2, x_3)$ and the visual media search result corresponding to the candidate translation has a feature vector of $Y=(y_1, y_2, y_3)$, the cosine distance is:

$$\text{cosine distance} = \frac{X \bullet Y}{\|X\| \cdot \|Y\|} = \frac{x_1 \cdot y_1 + x_2 \cdot y_2 + x_3 \cdot y_3}{\sqrt{x_1^2 + x_2^2 + x_3^2} \cdot \sqrt{y_1^2 + y_2^2 + y_3^2}}.$$

Other comparisons of the feature vectors and other estimates of visual similarity can also be used to generate the feature score. For example, the similarity score calculator can use one or more of the hamming distance, Jaccard index, or Euclidian distance for the two vectors.

The feature scores to similarity score generator 210 receives the feature score (e.g., 214) for each pair of visual media search results and generates an overall similarity score 206 for the phrase and the candidate translation from the feature scores. In some implementations, the score generator 210 generates the similarity score 206 by averaging all of the feature scores, or a subset of the feature scores. For example, the score generator 210 can average all of the feature scores, the top five feature scores out of all of the feature scores, or the top five feature scores for each set of pairs that includes a given visual media search result in the set of visual media search results 204 responsive to a query for the candidate translation. Selecting a subset of the top feature scores, rather than all of the feature scores can reduce the effect of outlier visual media search results that are not a good representation of the meaning of the phrase or translation. Other methods for generating the similarity score from the feature scores are also possible. For example, in some implementations, the score generator 210 generates the similarity score by summing all of the feature scores, or a subset of the feature scores.

In alternative implementations, the similarity score calculator uses other estimates of visual similarity for the two sets of visual media search results, for example, uses various set comparison techniques, instead of comparing the vectors of features corresponding to the individual visual media search results.

Figure 3A:
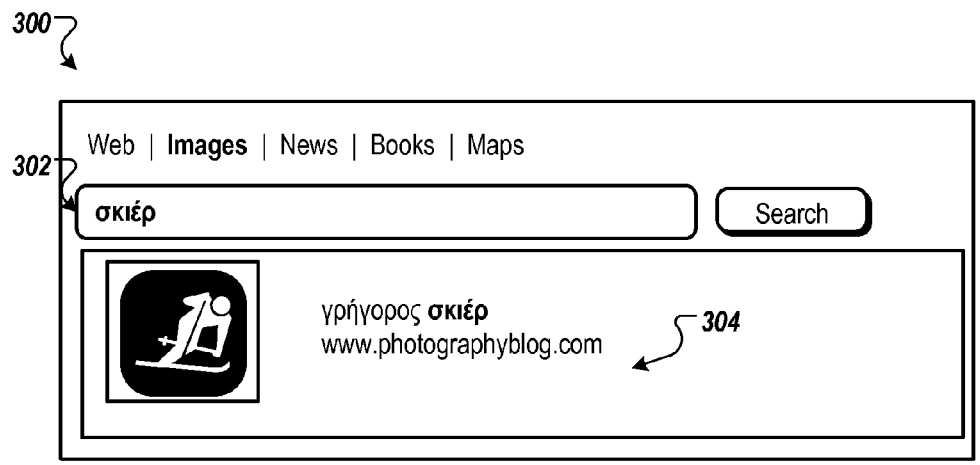
FIGS. 3A and 3B illustrate visually similar search results responsive to a query for a phrase and a query for a translation of the phrase.
Figure 3B:
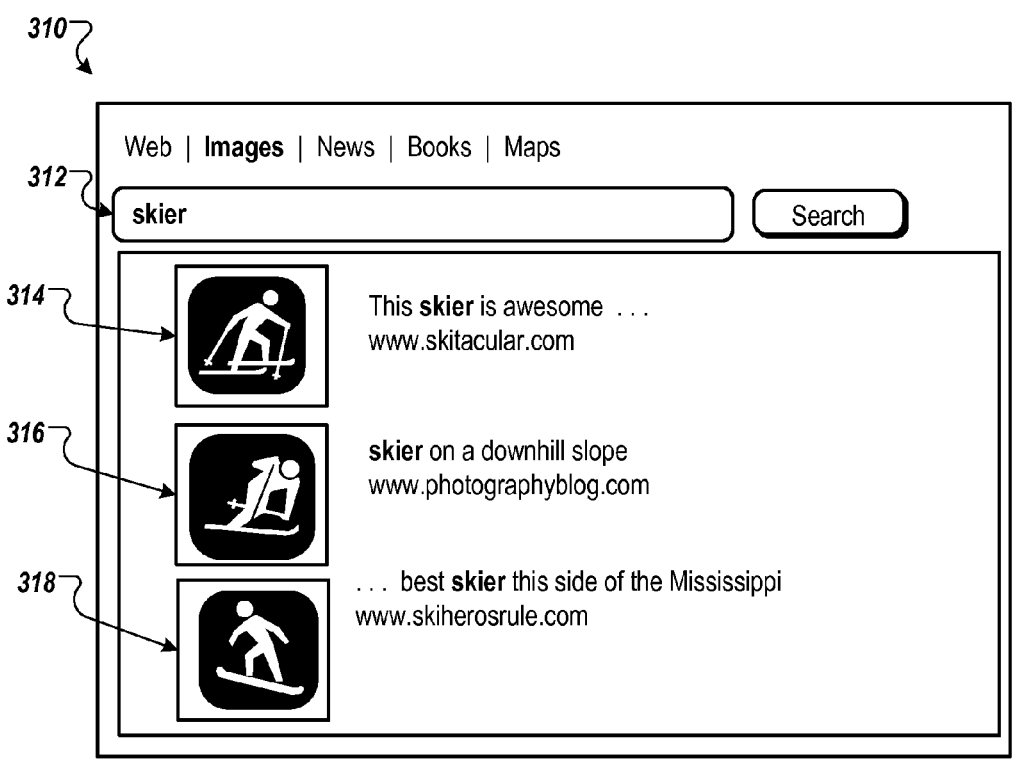

FIGS. 3A and 3B illustrate visually similar visual media search results responsive to a query for a phrase ("σκιέρ") 302 and a query for a translation of the phrase ("skier") 312).

FIG. 3A illustrates an example user interface 300 for a search engine that displays a visual media search result 304 responsive to a visual media search query for "σκιέρ" 302, meaning "skier" in Greek.

FIG. 3B illustrates an example user interface 310 for a search engine that displays visual media search results 314, 316, and 318 responsive to a visual media search query for "skier" 312.

The search results 304, 314, 316, and 318 shown in FIGS. 3A and 3B are visually similar. Each image is of a person skiing and includes a person (with a round head and one or two long rectangles for legs) and one or more long horizontal lines representing skis; each image is a white silhouette on a black background. Search results 304 and 316 are even the same image. The feature scores for these images would indicate this high visual similarity, and thus the phrase "σκιέρ" and the phrase "skier" would have a similarity score that indicates strong similarity.

Figures 4A, 4B:
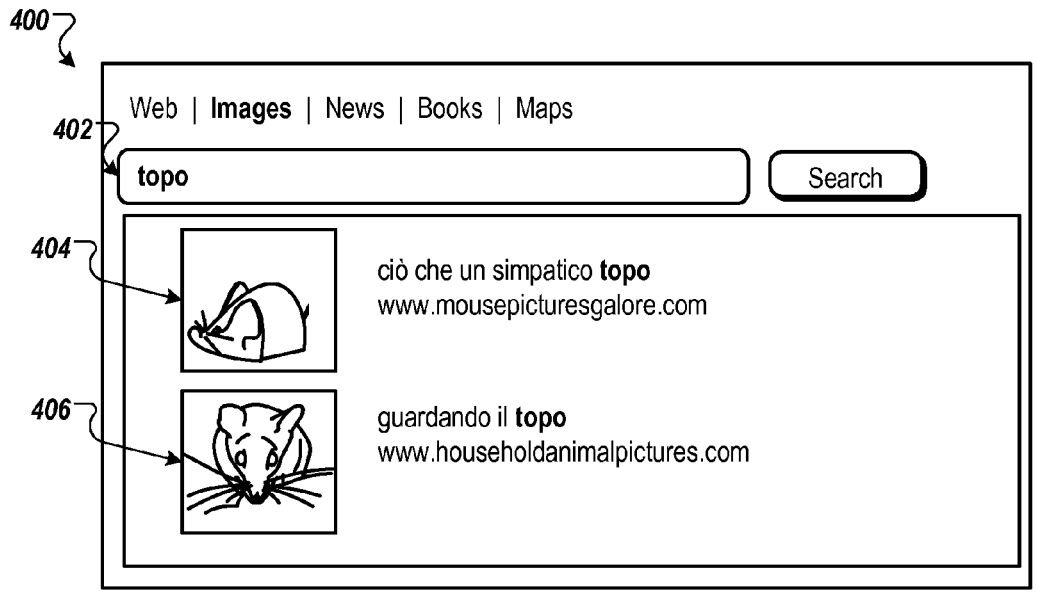
FIGS. 4A and 4B illustrate visually dissimilar search results responsive to a query for a phrase and a query for a translation of the phrase.

FIGS. 4A and 4B illustrate visually dissimilar search results responsive to a query for a phrase ("top( )") 402 and a query for a translation of the phrase ("mouse") 452.

FIG. 4A illustrates an example user interface 400 for a search engine that displays visual media search results 404 and 406 responsive to a visual media search query for "top( )" 402, meaning "mouse" in Italian.

FIG. 4B illustrates an example user interface 450 for a search engine that displays visual media search results 454, 456, and 458 responsive to a visual media search query for "mouse" 452.

The feature score for some pairs of these images shown in FIGS. 4A and 4B, for example, images 404 and 452 and images 406 and 454, will indicate a high similarity between the features of the image, because each image is a picture of a mouse (the animal) and therefore the images share similar features. For example, each picture includes the rounded ears of the mouse and diagonal line whiskers. However, the feature scores for other pairs of the images, for example, images 406 and 456 or images 406 and 458 will have low similarity. Images 456 and 458 are pictures of a mouse (the computer input device) and not a mouse (the animal). Therefore they lack the features such as the rounded ears and diagonal line whiskers of image 406. If images 404 and 406 are just compared to images 456 and 458, the similarity score for the phrase "top( )" and the phrase "mouse" will not indicate a very strong similarity. If the images 404 and 406 are further compared to image 454, there will be a stronger similarity, but it will likely not be as strong of a similarity as the similarity score between "σκιέρ" and the phrase "skier" described above with reference to FIGS. 3A and 3B.

Figure 5A:
FIGS. 5A and 5B illustrate an example use of translations validated using a translation validator.
Figure 5B:
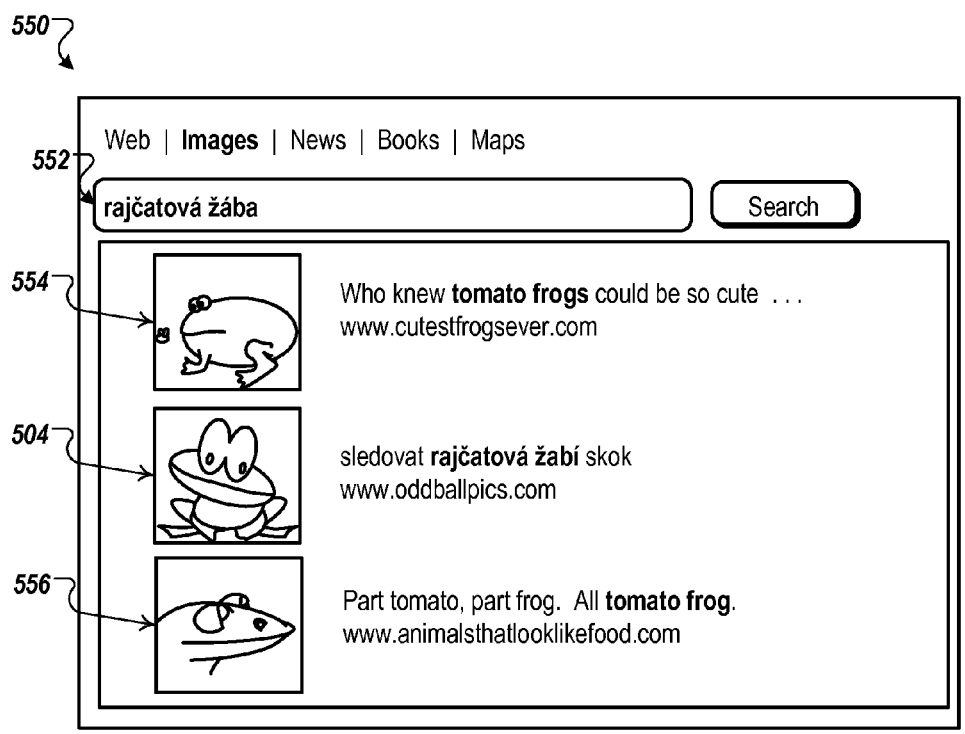

FIGS. 5A and 5B illustrate an example use of translations validated using the translation validator 102.

FIG. 5A illustrates an example user interface 500 for a search engine that presents visual search results in response to a query. The user interface 500 of FIG. 5A presents two search results (504, 506) generated in response to the search query "rajčatová žába" 502, which means "tomato frog" in Czech. One of the search results 504 is an image of a tomato frog, but the other search result 506 is an unrelated image that is likely irrelevant to query.

The small group of relevant search results shown in FIG. 5A can be disappointing to a user. There are many reasons a group of search results can be small, including an unusual topic or a misspelled search query. However, in many cases, the group of search results is small because of the language the user is searching in. Some concepts are more popular in certain languages. For example when discussing the Golden Gate Bridge in San Francisco, Calif., people are more likely to use English than Dutch, because the Golden Gate Bridge is a United States' landmark, and the English phrase is how the bridge is named in the United States. If a user has entered a search query in a natural language where the search query is not a popular concept, few results may be returned. This is true even though the search query concept may be very popular in other natural languages and, if the user entered a visual media search query in one of those other languages, he or she would be presented with a larger number of search results.

FIG. 5B illustrates an example user interface 550 for presenting search results from a search engine where a user has entered a visual media search query in one natural language (Czech) and the search engine has generated associated results in two natural languages (Czech and English). The results correspond to the Czech query "rajčatová žába" 552 and its translation into English ("tomato frog"). The result set shown in FIG. 5B is a more robust group of search results. The result from FIG. 5A 504 is again presented, but it is proceeded by an additional result in English 554 and followed by an additional result in English 556.

Thus, in some cases, augmenting a visual media search query with a valid translation into a different language increases the number of relevant search results returned to a user. By way of illustration, a search engine can use translations identified by a translation validator 102 to enhance the number and quality of search results returned in response to a visual media search query. Because visual media typically involves image and video content which conveys information independent of language, the user is likely less concerned with the language of the search result and more concerned with the content of the visual media. Therefore, query translation is especially useful for visual media search queries. However, similar techniques could be used in any other type of search, for example, document searches or product searches.

While FIG. 5 illustrates one example use of the translation validator, other uses are also possible. For example, when the translation validator 102 validates relationships between phrases and candidate related phrases, the validated relationships can be used for query suggestion. For example, in some implementations, when a user submits a query with text corresponding to a phrase to a search system, the search system retrieves related candidate phrases validated by the translation validator 102 and presents those phrases to the user as query suggestions.

Figure 6:
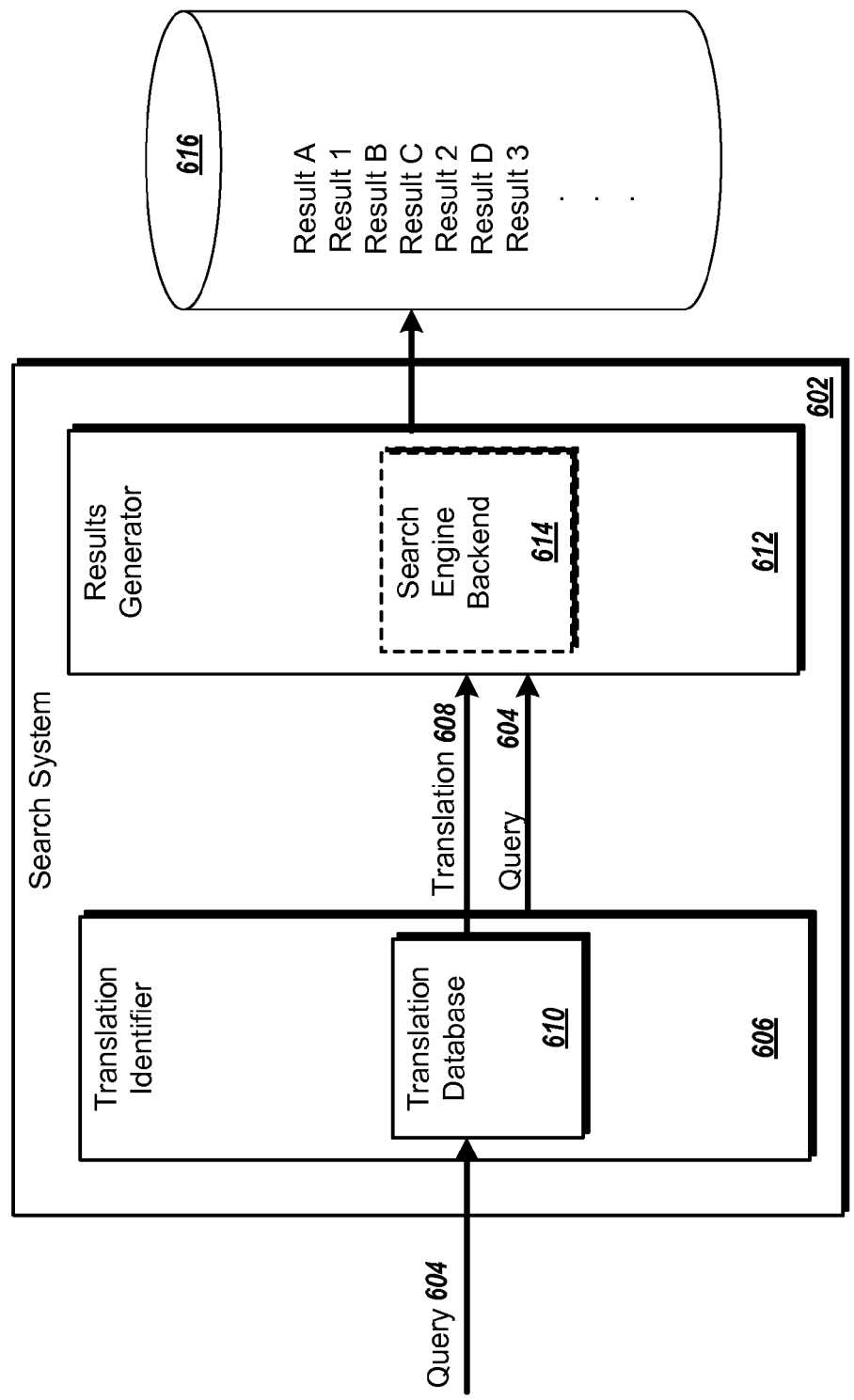
FIG. 6 illustrates an example of a search system that generates visual media search results using a query augmented with a translation of the query.

FIG. 6 illustrates an example of a search system 602 that generates visual media search results using a query augmented with a translation of the query.

A search system 602 receives a query 604. In some implementations, the search system 602 uses the translation identifier 606 to select a translation 608 for the text of the query 604, e.g., by retrieving a translation associated with the text of the query from a translation database 610. The translation database can be generated, for example, using the translation validator 102. In alternative implementations, the translation identifier 606 includes a translation validator that selects a translation 608 for the text of the query as needed, for example, as described above with reference to FIGS. 1 and 2.

The search system 602 then passes the query 604 and its translation 608 to a results generator 612. The results generator 612 searches for the query 604 and its translation 608 in one or more corpora of documents (e.g., a collection of documents, visual media, and other information that can be searched, for example, by a search engine), resulting in a set of visual media search results 616. The set of results includes results responsive to the query 604 and also includes results responsive to the translation of the query 608. In FIG. 6, Results A, B, C, and D are results in the language of the query 604 (e.g., search results responsive to a search for the query 604), and Results 1, 2, and 3 are results in the language of the translation of the query 608 (e.g., search results responsive to a search for the translation of the query 608).

The results generator can generate the results in a number of ways. In various implementations, the results generator 612 combines the query and its translation into one query that searches for the query and its translation with equal weight. For example, if the query 604 is "De Toren Van Eiffel" (Dutch for "the Eiffel Tower") and the translation 608 is "Tour Eiffel" (French for "the Eiffel Tower"), the combined query would be, for example, "'De Toren Van Eiffel' or 'Tour Eiffel.'" The combined query is then passed to a search engine backend 614 that generates the set of search results 616.

In some implementations, the results generator combines the two queries into one query, but weights the results corresponding to the two queries differently, for example, by weighting the search results responsive to the translated query using the similarity score for the translated query 608, or a quality of results statistic for the results associated with the translated query 608. In general, the quality of results statistic for a query measures how useful users found search results responsive to a query and is derived from data indicating user behavior, for example, search history data. In some implementations, the quality of results statistic for a query is the click through rate of the query. The click through rate is calculated by taking the number of times users selected one or more search results after submitting the translated query (or a query similar to the translated query) and dividing that by the total number of times the translated query (or the similar query) was submitted by the population of users. Other quality of results statistics are possible, for example, the total number of times a user selected one or more search results responsive to the query after submitting the translated query (or similar query), or the total number of search results responsive to the query that users selected after users submitted the translated query. The quality of results statistic can also further reflect the dwell time associated with one or more of the search results corresponding to the query in the search history. Dwell time is the amount of time a user spends viewing a search result. Dwell time can be a continuous number, such as the number of seconds a user spends viewing a search result, or it can be a discrete interval, for example "short clicks" corresponding to clicks of less than thirty seconds, "medium clicks" corresponding to clicks of more than thirty seconds but less than one minute, and "long clicks" corresponding to clicks of more than one minute. In some implementations, a longer dwell time of one or more results is associated with a higher quality of results statistic. The quality of results statistic is higher because users found the results with a longer dwell time useful enough to view for a longer period of time.

In some implementations, the results generator 612 uses the search engine backend 616 to run two searches: one corresponding to the query 610 and one corresponding to its translation 612. The results generator then combines the resulting sets of results, for example, by ordering the search results according to scores associated with the search results by the search engine backend 616, for example, scores estimating the relevance of each search result.

The search engine backend can be part of the results generator, a separate process run on the same computer as the results generator, or a separate process run on a different computer.

Other methods of generating a set of search results responsive to a query and its translation are possible.

Figure 7:
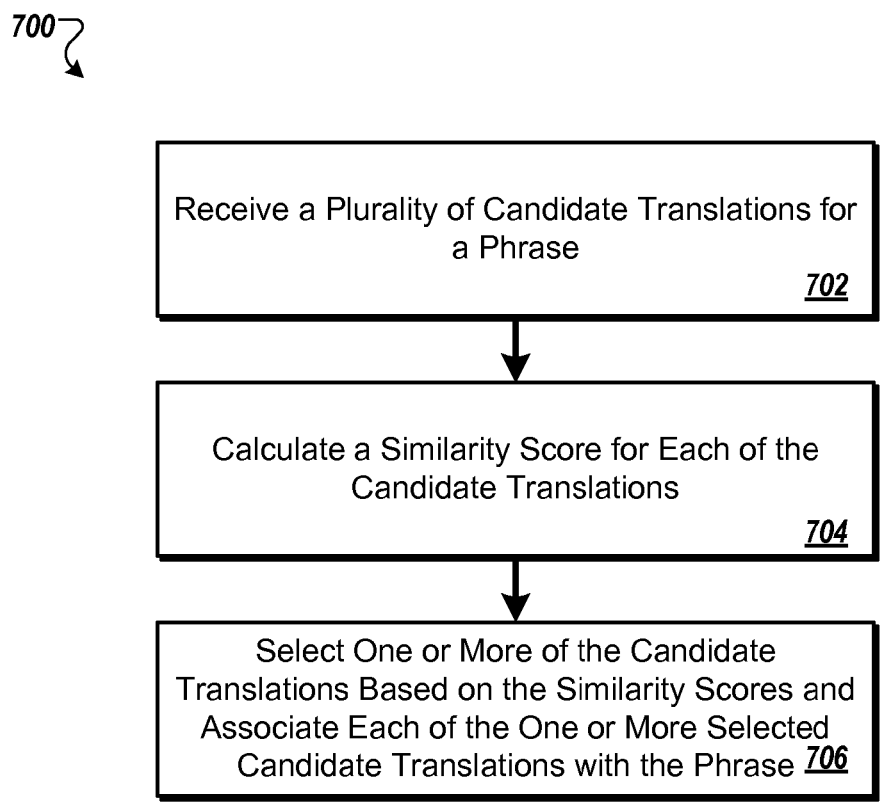
FIG. 7 illustrates an example method for identifying valid translations for a phrase.

FIG. 7 illustrates an example method 700 for identifying valid translations for a phrase. For convenience, the example method 700 will be described in reference to a system that performs the method 700. The system can be, for example, the translation validator 102.

The system receives a plurality of candidate translations for a phrase (step 702). The phrase is one or more words or symbols. The candidate translations can be received, for example, from a system component that stores or generates translations, for example, a translation dictionary, or from a component external to the system.

The system calculates a similarity score for each of the candidate translations (step 704). The similarity score is an estimate of visual similarity between a first group of visual media search results responsive to a first visual media search query with text corresponding to the phrase and a second group of visual media search results responsive to a second visual media search query with text corresponding to the phrase. The similarity scores are calculated, for example, as described above with reference to FIG. 2. The first and second groups of visual media search results are selected, for example, as described above with reference to FIG. 1.

The system selects one or more of the candidate translations based on the similarity scores and associates each of the one or more selected candidate translations with the phrase as a valid translation for the phrase (step 706). The system selects the candidate translations, for example, as described above with reference to FIG. 1. In some implementations, the selection is further based on a quality of results statistic for a query corresponding to the candidate translation. For example, the system can select only candidate translations whose similarity score satisfies a threshold and whose corresponding quality of results statistic satisfies a threshold. The system calculates the quality of result statistic for a query, for example, as described above with reference to FIG. 5. The thresholds can be determined, for example, empirically.

In some implementations, the system receives a third visual media search query with text corresponding to the phrase, identifies the selected one or more candidate translations associated with the phrase, and generates a set of one or more visual media search results based on the third visual media search query and the selected one or more candidate translations, for example, as described above with reference to FIG. 6. In some implementations, the visual media search query is received from a user (e.g., through a search engine user interface). In alternative implementations, the visual media search query is received from a computer or a process running on a computer.

Figure 8:
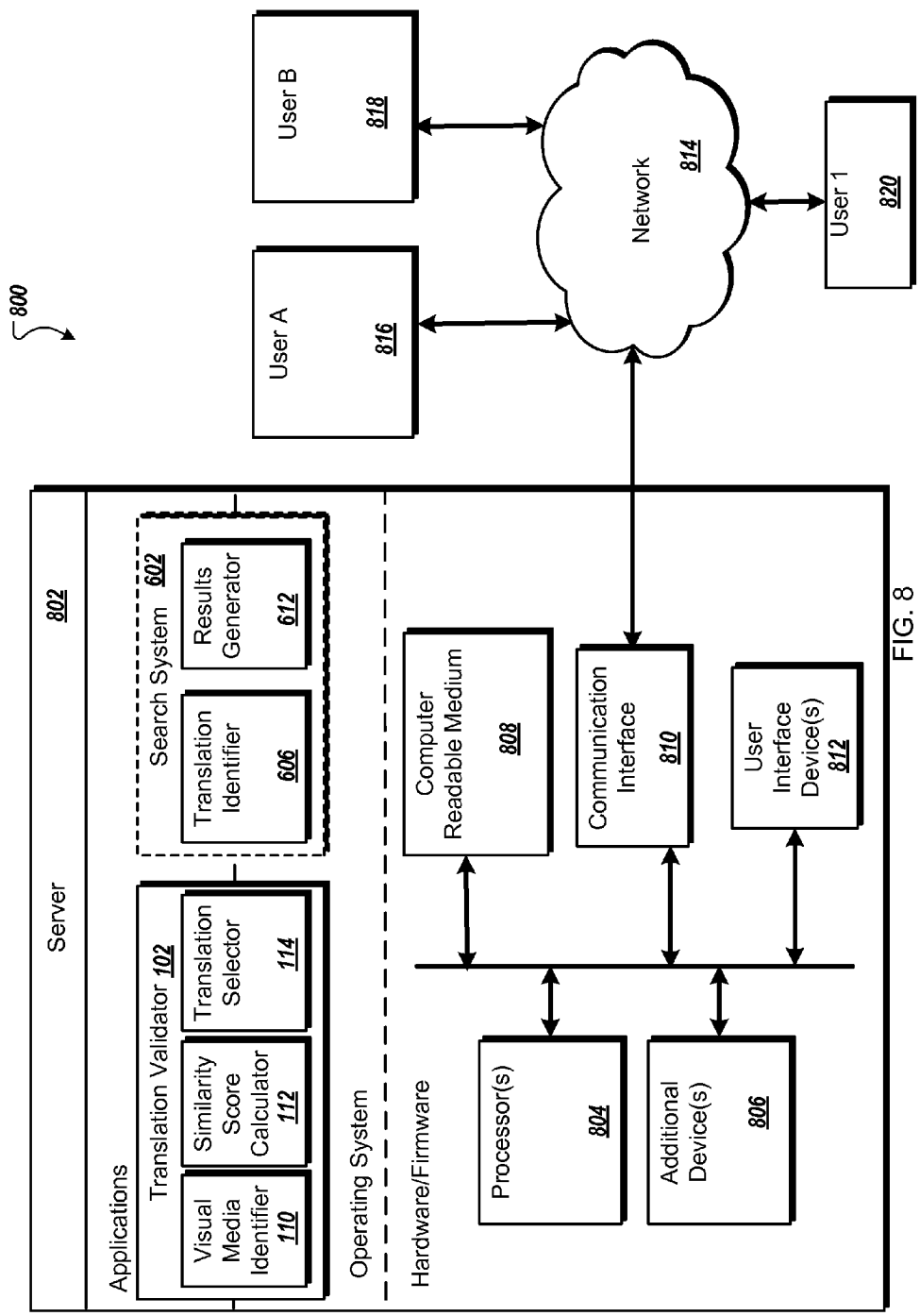
FIG. 8 illustrates an example architecture of a system.

FIG. 8 illustrates an example architecture of a system 800. The system generally consists of a server 802, user computers A and B 816 and 818, and a user computer 1 820. The server 802 and user computers 816, 818, and 820 are connected through a network 814.

The server 802 consists of one or more data processing apparatus. While only one data processing apparatus is shown in FIG. 8, multiple data processing apparatus can be used. The server includes various modules, e.g. executable software programs, including a translation validator 102 and an optional search system 602. Each module runs as part of the operating system on the server, runs as an application on the server, or runs as part of the operating system and part of an application on the server.

The translation validator 102 includes a visual media identifier 110, similarity score calculator 112, a translation selector 114. The translation validator selects valid translations for a phrase from a set of candidate translations, for example, as described above with reference to FIGS. 1 and 7. The visual media identifier 110 selects images responsive to a visual media search query for the phrase and images responsive to a candidate translation for the phrase, for example, as described above with reference to FIG. 1. The similarity score calculator 112 calculates a similarity score for the phrase and the candidate translation, for example, as described above with reference to FIGS. 2 and 7. The translation selector 114 selects one or more candidate translations based on the similarity scores, for example, as described above with reference to FIGS. 1 and 7.

The optional search system 602 includes a translation identifier 606 and a results generator 612. The search system 602 returns visual media search results responsive to a query and one or more candidate translations associated with the text of the query, for example, as described above with reference to FIG. 5.

The data processing apparatus 802 can also have hardware or firmware devices including one or more processors 804, one or more additional devices 806, computer readable medium 808, a communication interface 810, and one or more user interface devices 812. Each processor 804 is capable of processing instructions for execution within the server 802. In some implementations, the processor 804 is a single-threaded processor.

In other implementations, the processor 804 is a multi-threaded processor. Each processor 804 is capable of processing instructions stored on the computer readable medium 808 or on the storage device 830. The server 802 uses its communication interface 810 to communicate with one or more computers, for example, over a network. Examples of user interface devices 812 include a display, a camera, a speaker, a microphone, a tactile feedback device, a keyboard, and a mouse.

The server 802 can store instructions that implement operations associated with the modules described above, for example, on the computer readable medium 808 or one or more additional devices 806, for example, one or more of a floppy disk device, a hard disk device, an optical disk device, or a tape device. In some implementations, the data processing apparatus 802 also stores additional data, for example, a translation database 610, visual media search results, or other data, on the computer readable medium 808 or one or more additional devices.

User computers A and B 816 and 818 are connected to the server 802 through the network 814. Users submit search queries to the server 802 and select search results received from the server 802 using their computers 816 and 818, for example, using a web-browser running on the computers 816 and 818. The submitted search queries can be any type of search query, including visual media search queries and document search queries. The server generates search history data based on queries submitted from user computers A and B 816 and 818, for example, by tracking what search queries are submitted by users and what search results responsive to a query are selected by a user. This search history is used by the visual media identifier 110 to select images responsive to a query, and may also be used by the translation selector 114 to select valid translations, for example, as described above with reference to FIGS. 1 and 7.

User 1 uses a client computer 820 to submit a visual media search query to the server 802 and to view search results corresponding to the submitted visual media search query and one or more translations of the search query.

While the system 800 of FIG. 8 includes a user who submits a visual media search query through their computer, the visual media search query does not have to be received from a user or a user's computer, but can be received from any data processing apparatus, process, or person, for example a computer or a process run on a computer, with or without direct user input. Similarly, the results do not have to be presented to the user's computer but can be presented to the data processing apparatus, process, or person that sent the visual media search query to the server or a different data processing apparatus, process, or person. While the system 800 of FIG. 8 envisions receiving a series of search queries and results selections from a plurality of users user A 816 and user B 818, the search queries and results selections do not have to be received directly from a population of users but can be received, for example, from another computer that aggregates user search history information.

Figure 9:
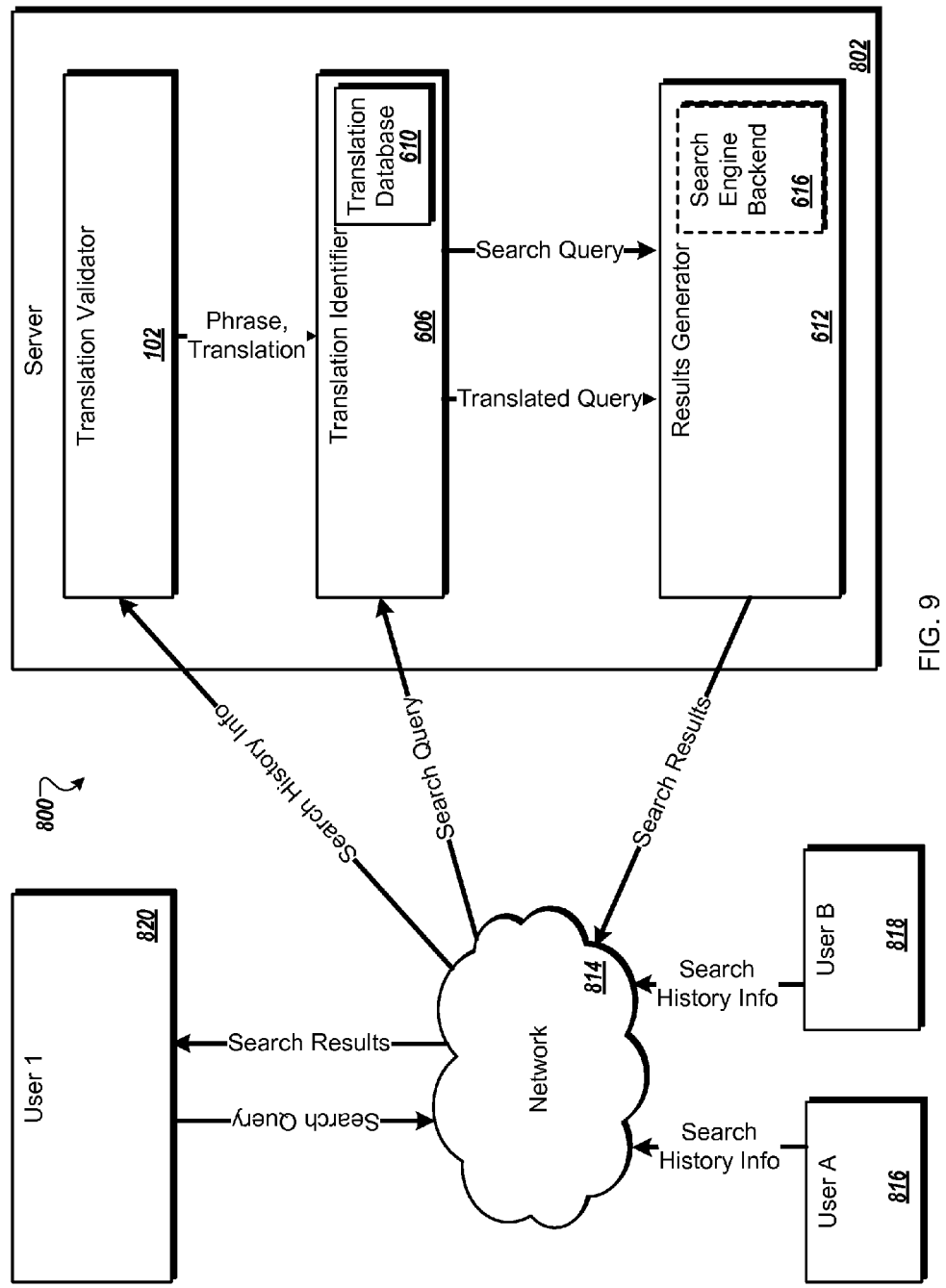
FIG. 9 illustrates example information flow through the system illustrated in FIG. 8.

FIG. 9 illustrates example information flow through the system 800.

As shown in FIG. 9, the server 802 receives search history information from the computers of user A and user B 816 and 818 through the network 814, for example, when the users submit search queries from their computers and select search results responsive to the queries from their computers. In some implementations, the server 802 stores the search history information, for example, on a computer readable medium. While only two user computers are shown sending search history information in FIG. 9, a plurality of computers corresponding to a population of users may be used. In some implementations, the search history information is received from a computer other than the computer that the user used to submit queries and search result selections. For example, the search history information can be received from a third party computer that aggregates user search histories.

The user search history is provided to a translation validator 102 that identifies visual media search results to use in translation validation from the search history data, for example, as described above with reference to FIG. 1. The translation validator can determine valid translations for a phrase in advance and store them, for example, in the translation database 610, or can determine the valid translations as needed, for example, in response to the server 802 receiving a visual media search query for a phrase from user 1's computer 820.

User 1 sends a visual media search query from user 1's computer 820 to the server 802 through the network 814. The server uses its translation identifier 606 to identify a translation for the visual media search query, for example, by retrieving the translation from the translation database 610 or by requesting a translation of the phrase from the translation validator 102.

The server 802 then sends the search query and the translated query to the results generator 612, and the result generator 612 generates a set of visual media search results for the query and its translation. In some implementations, the results generator generates a set of search results by combining the search query and the translated search query into one query and using a search engine backend 616 to run a search corresponding to the combined query, for example, as described above with reference to FIG. 6. In alternative implementations, the results generator 612 generates a set of search results by sending two queries to the search engine backend 616, one corresponding to the search query and one corresponding to the translated search query, receiving two sets of results from the search engine backend 612, and combining the results, for example, as described above with reference to FIG. 6. In some implementations, the search engine backend 616 is run on the server 802. In these implementations, the search engine backend 616 is part of the results generator 612, or a separate component of the system. In alternative implementations, the search engine backend 616 is run on a separate data processing apparatus.

Once the results generator 612 has generated a group of visual media search results, the server 802 presents the search results by sending them through the network 814 to the device that submitted the search query 820.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving a plurality of candidate translations for a phrase, wherein the phrase is in a first language and each candidate translation is a translation of the phrase into a different language from the first language;
obtaining a first group of visual media search results, wherein the first group of visual media search results are responsive to a first visual media search query with text corresponding to the phrase;
obtaining a respective second group of visual media search results for each of the candidate translations, wherein the second group of visual media search results are responsive to a second visual media search query with text corresponding to the candidate translation;
generating a respective quality of results statistic for each of the candidate translations, wherein the quality of results statistic for each of the candidate translations is a value that represents a quality of search results that are responsive to the second visual media search query with text corresponding to the candidate translation;
calculating, by one or more computers, a respective similarity score for each of the candidate translations, wherein the similarity score is an estimate of visual similarity between the first group of visual media search results and the second group of visual media search results for the candidate translation;
selecting one or more of the candidate translations based on, for each candidate translation, the similarity score for the candidate translation and the quality of results statistic for the candidate translation; and
associating each of the one or more selected candidate translations with the phrase as a valid translation for the phrase.

2. The method of claim 1, wherein calculating the similarity score for a candidate translation comprises:
generating feature scores for pairs of visual media search results, wherein each pair includes a respective visual media search result from the first group of visual media search results and a respective visual media search result from the second group of visual media search results, and wherein each feature score estimates visual similarity between a pair's respective visual media search results from a plurality of features of the respective visual media search results; and
generating the similarity score from the feature scores.

3. The method of claim 2, wherein generating the similarity score from the feature scores includes averaging a number of top feature scores.

4. The method of claim 2, wherein generating the similarity score from the feature scores comprises:
for each first visual media search result in the first group of visual media search results, selecting a top number of feature scores for pairs including the first visual media search result; and
calculating an average of the selected feature scores.

5. The method of claim 1, wherein:
the first group of visual media search results are identified according to data indicative of user behavior for visual media search results responsive to the first visual media search query; and
the second group of visual media search results responsive to the second visual media search query are identified according to data indicative of user behavior for visual media search results responsive to the second visual media search query.

6. The method of claim 1, further comprising:
receiving a third visual media search query with text corresponding to the phrase;
identifying the selected one or more candidate translations associated with the phrase; and
generating a set of one or more visual media search results based on the third visual media search query and the selected one or more candidate translations.

7. The method of claim 1, wherein each visual media search result in the first and second groups of visual media search results is an image, a video, an image embedded in a first file, or a video embedded in a second file.

8. The method of claim 1, wherein selecting one or more of the candidate translations comprises selecting only candidate translations having a similarity score that satisfies a first threshold value and a quality of results statistic that satisfies a second threshold value.

9. A non-transitory computer storage medium storing a program, the program comprising instructions that, when executed by a data processing apparatus, cause the data processing apparatus to perform operations comprising:
receiving a plurality of candidate translations for a phrase, wherein the phrase is in a first language and each candidate translation is a translation of the phrase into a different language from the first language;
obtaining a first group of visual media search results, wherein the first group of visual media search results are responsive to a first visual media search query with text corresponding to the phrase;
obtaining a respective second group of visual media search results for each of the candidate translations, wherein the second group of visual media search results are responsive to a second visual media search query with text corresponding to the candidate translation;
generating a respective quality of results statistic for each of the candidate translations, wherein the quality of results statistic for each of the candidate translations is a value that represents a quality of search results that are responsive to the second visual media search query with text corresponding to the candidate translation;
calculating a respective similarity score for each of the candidate translations, wherein the similarity score is an estimate of visual similarity between the first group of visual media search results and the second group of visual media search results for the candidate translation;
selecting one or more of the candidate translations based on, for each candidate translation, the similarity score for the candidate translation and the quality of results statistic for the candidate translation; and
associating each of the one or more selected candidate translations with the phrase as a valid translation for the phrase.

10. The non-transitory computer storage medium of claim 9, wherein calculating the similarity score for a candidate translation comprises:
generating feature scores for pairs of visual media search results, wherein each pair includes a respective visual media search result from the first group of visual media search results and a respective visual media search result from the second group of visual media search results, and wherein each feature score estimates visual similarity between a pair's respective visual media search results from a plurality of features of the respective visual media search results; and
generating the similarity score from the feature scores.

11. The non-transitory computer storage medium of claim 10, wherein generating the similarity score from the feature scores includes averaging a number of top feature scores.

12. The non-transitory computer storage medium of claim 10, wherein generating the similarity score from the feature scores comprises:
for each first visual media search result in the first group of visual media search results, selecting a top number of feature scores for pairs including the first visual media search result; and
calculating an average of the selected feature scores.

13. The non-transitory computer storage medium of claim 9, wherein:
the first group of visual media search results are identified according to data indicative of user behavior for visual media search results responsive to the first visual media search query; and
the second group of visual media search results responsive to the second visual media search query are identified according to data indicative of user behavior for visual media search results responsive to the second visual media search query.

14. The non-transitory computer storage medium of claim 9, further operable to cause data processing apparatus to perform operations comprising:
receiving a third visual media search query with text corresponding to the phrase;
identifying the selected one or more candidate translations associated with the phrase; and
generating a set of one or more visual media search results based on the third visual media search query and the selected one or more candidate translations.

15. The non-transitory computer storage medium of claim 9, wherein each visual media search result in the first and second groups of visual media search results is an image, a video, an image embedded in a first file, or a video embedded in a second file.

16. The non-transitory computer storage medium of claim 9, wherein selecting one or more of the candidate translations comprises selecting only candidate translations having a similarity score that satisfies a first threshold value and a quality of results statistic that satisfies a second threshold value.

17. A system comprising one or more computers programmed to perform operations comprising:
receiving a plurality of candidate translations for a phrase, wherein the phrase is in a first language and each candidate translation is a translation of the phrase into a different language from the first language;
obtaining a first group of visual media search results, wherein the first group of visual media search results are responsive to a first visual media search query with text corresponding to the phrase;
obtaining a respective second group of visual media search results for each of the candidate translations, wherein the second group of visual media search results are responsive to a second visual media search query with text corresponding to the candidate translation;
generating a respective quality of results statistic for each of the candidate translations, wherein the quality of results statistic for each of the candidate translations is a value that represents a quality of search results that are responsive to the second visual media search query with text corresponding to the candidate translation;

calculating a respective similarity score for each of the candidate translations, wherein the similarity score is an estimate of visual similarity between the first group of visual media search results and the second group of visual media search results for the candidate translation;

selecting one or more of the candidate translations based on, for each candidate translation, the similarity score for the candidate translation and the quality of results statistic for the candidate translation; and associating each of the one or more selected candidate translations with the phrase as a valid translation for the phrase.

18. The system of claim 17, wherein calculating the similarity score for a candidate translation comprises:

generating feature scores for pairs of visual media search results, wherein each pair includes a respective visual media search result from the first group of visual media search results and a respective visual media search result from the second group of visual media search results, and wherein each feature score estimates visual similarity between a pair's respective visual media search results from a plurality of features of the respective visual media search results; and generating the similarity score from the feature scores.

19. The system of claim 18, wherein generating the similarity score from the feature scores includes averaging a number of top feature scores.

20. The system of claim 18, wherein generating the similarity score from the feature scores comprises:

for each first visual media search result in the first group of visual media search results, selecting a top number of feature scores for pairs including the first visual media search result; and calculating an average of the selected feature scores.

21. The system of claim 17, wherein:

the first group of visual media search results are identified according to data indicative of user behavior for visual media search results responsive to the first visual media search query; and the second group of visual media search results responsive to the second visual media search query are identified according to data indicative of user behavior for visual media search results responsive to the second visual media search query.

22. The system of claim 17, further programmed to perform operations comprising:

receiving a third visual media search query with text corresponding to the phrase;

identifying the selected one or more candidate translations associated with the phrase; and generating a set of one or more visual media search results based on the third visual media search query and the selected one or more candidate translations.

23. The system of claim 17, wherein each visual media search result in the first and second groups of visual media search results is an image, a video, an image embedded in a first file, or a video embedded in a second file.

24. The system of claim 17, wherein selecting one or more of the candidate translations comprises selecting only candidate translations having a similarity score that satisfies a first threshold value and a quality of results statistic that satisfies a second threshold value.

* * * * *

UNITED STATES PATENT AND TRADEMARK OFFICE
CERTIFICATE OF CORRECTION

| | | |
|---|---|---|
| PATENT NO. | : 8,538,957 B1 | Page 1 of 1 |
| APPLICATION NO. | : 12/477577 | |
| DATED | : September 17, 2013 | |
| INVENTOR(S) | : Yun Zhou et al. | |

It is certified that error appears in the above-identified patent and that said Letters Patent is hereby corrected as shown below:

Title Page 2, Item (56) Column 1, Line 10, in Other Publications, delete "donwloads" and insert --downloads-- therefor.

Title Page 2, Item (56) Column 2, Line 19, in Other Publications, delete "hundereds-of-lanugages" and insert --hundreds-of-languages-- therefor.

Signed and Sealed this
Thirteenth Day of May, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,538,957 B1 | Page 1 of 1 |
| APPLICATION NO. | : 12/477577 | |
| DATED | : September 17, 2013 | |
| INVENTOR(S) | : Zhou et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 747 days.

Signed and Sealed this
Seventh Day of April, 2015

Michelle K. Lee
*Director of the United States Patent and Trademark Office*